United States Patent

[19]

Soubaras

[11] Patent Number: 5,864,590
[45] Date of Patent: Jan. 26, 1999

[54] PROCEDURE FOR TRANSMISSION OF INFORMATION ON A CHANNEL INCLUDING A SYSTEM FOR RECEPTION OF DATA SIGNALS BY SAMPLING USING CLOCK SIGNALS

[75] Inventor: Hélène Soubaras, Orsay, France

[73] Assignee: Thomson-CSF, Paris, France

[21] Appl. No.: 588,806

[22] Filed: Jan. 19, 1996

[30] Foreign Application Priority Data

Jan. 27, 1995 [FR] France .................................. 95 00967

[51] Int. Cl.[6] .............................. H03M 13/00; H04L 7/00
[52] U.S. Cl. ..................... 375/341; 375/355; 371/43.6; 371/46
[58] Field of Search .................... 375/341, 355; 371/43, 46, 43.6, 43.7

[56] References Cited

U.S. PATENT DOCUMENTS 5,263,033  11/1993  Seshadri ..................................... 371/43

FOREIGN PATENT DOCUMENTS 0 510 756  10/1992  European Pat. Off. .
0 544 315   6/1993  European Pat. Off. .
0 602 249   6/1994  European Pat. Off. .
0 604 209   6/1994  European Pat. Off. .

OTHER PUBLICATIONS

IREECON '91, Australia's Electronics Convention Proceedings, vol. 2, Sep. 16–20, 1991, pp. 634–637, L. P. Sabel, "The Effect of Improved Signal Slope Estimation on the Performance of Symbol Timing Recovery for Digital Communications".

C.N. Georghiades, et al., "Sequence Estimation and Synchronization from Nonsynchronized Samples", IEEE Transactions on Information Theory, vol. 37, No. 6, Nov. 1991, (pp. 1649–1657).

K. Okanoue, et al., "A Fractionally Spaced MLSE Receiver Improving Degradation Caused by Sampling Phase Offset", Radio Communication System Research Meeting Report RCS 92–93, The Institute of Electronics, Information and Communication Engineers in Japan, Jun. 26, 1992, (pp. 71–76).

Ascheid, G., Oerder, M., Stahl., J., and Meyr, H., "An all Digital Receiver Architecture for Bandwidth Efficienct Transmission at High Data Rates," IEEE Transactions on Communications, vol. 37, No. 8, pp. 804–813, Aug. 1989.

*Primary Examiner*—Stephen Chin
*Assistant Examiner*—Jeffrey W. Gluck
*Attorney, Agent, or Firm*—Oblon, Spivak, McClelland, Maier & Neustadt, P.C.

[57] ABSTRACT

A procedure for information transmission utilizing a system for reception of data signals using clock signals in which the phase shift between clock signals and data signals is calculated using a formulation of the gradient $t_{n+1}=t_n+p/q-\alpha e_n(t_n)e'_n(t_n)$. The phase shift signal $(t_{n+1})$ is calculated for an (n+1) data signal, the phase shift signal $(t_n)$ is calculated for a $(_n)$ data signal, and (p/q) in the ratio of the clock period to the data period. In addition, $e_n(t_n)$ is the error between a real sample and an assumed theoretical value and $e'_n(t_n)$ is the derivative of $e_n(t_n)$ with respect to $(t_n)$.

6 Claims, 4 Drawing Sheets

(BINARY SIGNAL, CODING WITH 3 COEFFICIENTS
WITHOUT CODING, THEREFORE N=4)

a
PROCEDURE FOR TRANSMISSION OF INFORMATION ON A CHANNEL INCLUDING A SYSTEM FOR RECEPTION OF DATA SIGNALS BY SAMPLING USING CLOCK SIGNALS

BACKGROUND OF THE INVENTION

Field of the invention

The present invention concerns a procedure for the transmission of information, and particularly a procedure for reconstituting information received from samples obtained by sampling using a clock asynchronous with the received information signal. The invention is particularly applicable to reading magnetic records for VCRs, computer peripherals and special professional recorders.

More precisely, the invention does this reception by applying a Maximum Likelihood Sequence Estimation, hereinafter referred to as MLSE, and which uses a VITERBI algorithm described in the document "Principles of Digital Communications and Coding" by A. J. VITERBI et al, McGraw-Hill, 1979. The MLSE algorithm is described in the article "Maximum Likelihood Sequence Estimation of Digital Sequences in the Presence of Intersymbol Interferences" by G. David FORNEY, IEEE Transactions on Information Theory, vol. IT-18, No 3, pp. 363–378, May 1972. This algorithm has the constraint that a sampled signal must be processed synchronously with the data at a frequency $f_e$ equal to the frequency $f_s$ of the data signal.

In the case of an asynchronous system, preprocessing has to be carried out in addition to equalization to correct the phase using a Phase Locked Loop (PLL) interpolation. These operations do not give good results for withdrawal, in other words for very low frequencies $f_e$. Therefore $f_e$ is taken $>f_s$ (but as the fractional ratio for hardware installation reasons), such that decimation is subsequently necessary in order to obtain the right frequency.

Therefore, the present invention concerns application of the MLSE algorithm to asynchronous reception and extends to the case of data sampled at a frequency $f_e$ other than the signal frequency $f_s$. This means that a phase calculation has to be carried out between a data signal and the sampling clock.

SUMMARY OF THE INVENTION

Therefore, the present invention concerns a procedure for information transmission including a system for reception of data signals by sampling using clock signals, characterized in that it includes a procedure for calculating the phase shift between clock signals and data signals in which the operation which is carried out is a formulation of the gradient algorithm:

$$t_{n+1} = t_n + p/q - \alpha e_n(t_n) e'_n(t)$$

where:
$t_{n+1}$: is the phase shift signal to be calculated for the rank n+1 sample;
$t_n$: is the phase shift signal calculated previously for the rank n sample;
p/q: is the ratio of the clock period to the data period;
α: is a matching coefficient;
$e_n(t_n)$: the error between a real sample and the theoretical value that was assumed for this sample;
$e'_n(t_n)$: is the derivative of the value of $e_n(t_n)$ with respect to $t_n$, the value $e_n(t_n)$ being given by:

$$e_n(t) = \sum_k z_k h(nT_e - kT_s + t) - y_n$$

where:
$z_k$: is an assumed value of the data signal;
h: is the pulse response from the channel and the value $e'_n(tn)$ being given by:

$$e'_n(t) = \sum_k z_k h'(nT_e - kT_s + t)$$

where h' is the derivative of the channel pulse response with respect to time;
$T_e$: is the period $(1/f_e)$;
$T_s$: is the symbol sample period $(1/f_s)$; and
$Y_n$: is the sampled signal.

The phase estimation algorithm is new in the way it uses h'(t).

BRIEF DESCRIPTION OF THE DRAWINGS

The various purposes and characteristics of the invention will become more clear in the following description and with the accompanying drawings, wherein.

DETAILED DESCRIPTION OF THE INVENTION

Figure 1:
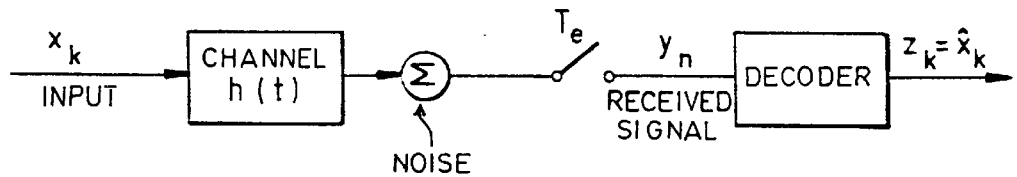
FIG. 1 shows a block diagram of a communication system.

A communication system may be shown diagrammatically as in FIG. 1.

The channel input $x_k$ is modeled by a sequence of Diracs delta-functions with a spacing equal to the symbol period $T_s = 1/f_s$. They take on a number of values at random, for example +1 and −1 for the binary case, and possibly with coding.

The channel has a continuous pulse response denoted h(t). Noise is added at its output. The period is then sampled:

$$1/f_e = T_e = p/q \, T_s (p/q \leq 1).$$

The sampled signal $y_n$ obtained has an arbitrary phase which is unknown a priori, $t_0$, and is to be estimated:

$$y_n = \sum_k x_k h(nT_e - kT_s + t_0) + b_n$$

giving:

$$-0.5 \leq t_0/T_s < 0.5.$$

In the synchronous case, $t_0 = 0$.

The advantage of the VITERBI algorithm is that it proposes assumptions for the channel input sequence. Therefore, we will use it by applying the algorithm for the gradient which has a classical general formulation, to the error squared function:

$$t_{n|n} = t_{n|n-1} - \alpha dE_n(t_{n|n-1})$$

where:

α is a coefficient $t_{n|n-1}$ is the phase estimate on the data of sample $y_n$ when the last received sample is $Y_{n-1}$;

$t_{n|n}$ is the estimate of this phase after $y_n$ has been finally received, and $E_n$ is the square of the error:

$$E_n(t_{n|n-1}) = e_n^2(t_{n|n-1})$$

and:

$$e_n(t) = \sum_k z_k h(nT_e - kT_s + t) - y_n \quad (1)$$

where:

$z_k$ is an assumed value of $x_k$

The concept is to take the exact formulation of the derivative since it can be known, instead of making an approximation as is the case, for example, for the LMS (Least Mean Square):

$$\begin{aligned} dE_n(t)/dt &= 2e_n(t) \sum_k z_k h'(nT_e - kT_s + t) \\ &= 2e_n(t)e_n'(t). \end{aligned}$$

There are several ways of finding the derivative h'(t) of the channel as a function of h(t) (which is available in digitized form). A differentiation can be made, or the FFT (Fast Fourier Transform), or any other digital method, can be used. This work will be done once only, before the decoding is performed. When integrating the new sample $y_{n+1}$ in the estimator, the phase skip inherent to $f_e$ and $f_s$ has to be added:

$$t_{n+1|n} = t_{n|n} + p/q \text{ (henceforth, } t_{n+1|n} \text{ will be denoted as } t_{n+1}\text{)}.$$

As soon as $t_{n+1} = 0.5$ is exceeded, 1 is subtracted from it and the subscript k for sample $X_k$ to be estimated is incremented by 1 (conversely, if $t_{n+1} < -0.5$, we will move backward by 1 sample; although this rarely happens in practice). In conclusion, we have:

$$t_{n+1} = t_n + p/q - \alpha e_n(t_n) e_n'(t_n) \quad (2)$$

For example, if h and h' are normalized to 1 at their maximum values, the simulation gives a fairly good convergence for a between 0.1 and 0.2 when the signal to noise ratio is about 20 dB.

Applying operation (2) thus determines the phase of a signal sample.

We will first define a term "assumption branch":

VITERBI's algorithm manipulates a lattice with N states, $x(1), x(2) \ldots x(N)$. For example, N=2 if a binary system is being used and if the part of the channel response outside a support size $2 T_s$, can be neglected. At each time step k, and for each state x(j) which forms an assumption on a given number of input signals (on an isolated bit $x_k$ in the example), a search is made for a previous probable state called a survivor x(j'). It is determined by exploring all allowable pairs (x(i), x(j)) for steps (k-1, k) (in the example, for all $x_{k-1}/X_k$ pairs). We will call these pairs to be explored the "assumption branches". In other words, they represent a part of the path.

It is known that in the VITERBI algorithm, a sample $y_n$ of the signal to be decoded for each assumption branch is available, and will be used to calculate the metric. The N metrics m(1) ... m(N) correspond to each of the N states of the lattice and must be stored in memory. We will now introduce the concept of the phase search, by also keeping in memory each of the N phase estimates t(1) ... t(N). We will assign their values before subtraction from 1, since it was necessary to go on to the next sample for the assumption branch considered. Therefore at each possible state x(i)i=1 ... N for $X_k$, we want to assign a survivor, a new metric and an update of the phase estimate.

Figure 3A:
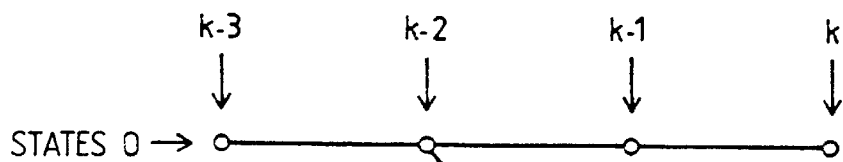
FIGS. 3a–3c show an example of simplified operation of the VITERBI algorithm.
Figure 3B:
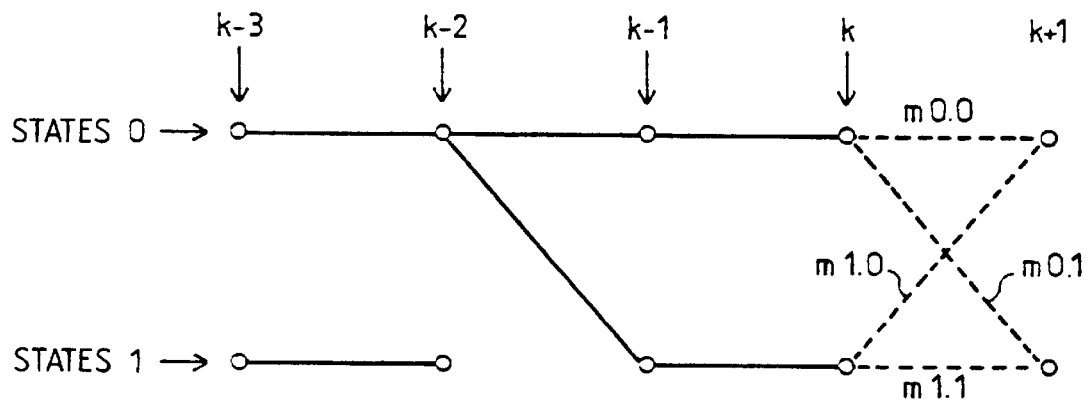
Figure 3C:
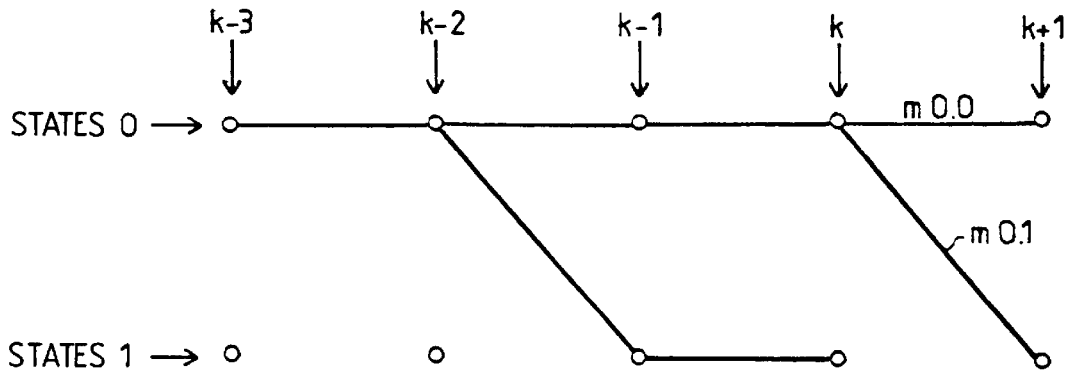

For example, as shown in FIG. 3a, samples k-3 to k are received. There are two states for each sample. Calculating the metrics leading to each state of each sample gives two possible paths for sample k. Then, when sample k+1 is received, metrics m0.0 and m1.0 between state 0 of this sample k+1 and states 0 and 1 of the previous sample k, are calculated (FIG. 3b). The lowest metric is chosen, for example m0.0. Metrics m0.1 and m1.1 between the state of sample k+1 and states 0 and 1 of the previous sample k are also calculated. For example, we may find that the shortest metric is m1.0. In this example, we will therefore select metrics m 0.0 and m0.1, as can be seen in FIG. 3c, and this procedure can eliminate the path segment leading to state 1 of sample k.

A new phenomenon that is not in the conventional VITERBI algorithm is that, for an assumption branch, we may need several samples of y instead of only one sample (particularly if p/q is not equal to 1). Their numbers vary due to variations in the estimated phase, and therefore it may vary as a function of the state x(i). The first consequence is that we have to memorize values n(1) ... n(N) of the last subscript of y depending on each state. The second consequence is that several distance values can be used for the metric calculation (since the phase is reestimated for each sample of y). The concept is to use a metric of the following type:

$$\sum_n e_n^2(t_n)$$

where n scans through subscripts of samples of y corresponding to the assumption branch.

Samples of y for which the phase is close to + or −0.5 carry less information than branches in which the phase is close to zero, due to the amplitude of the channel response, and therefore their signal to noise ratios in these locations (or conversely, depending on the chosen origin). Therefore, this metric will be weighted, in order to improve the error ratio. Furthermore, the sum of the weights must always be the same in order to avoid unbalancing metrics between two assumption branches with different numbers of samples (for example, 1 may be chosen). It follows that the metric will be in the following form:

$$m(i) = \frac{\sum_n p(t_n) e_n^2(t_n)}{\sum_n p(t_n)} \quad (3)$$

where $p(t_n)$ values refer to the weights assigned to phases $t_n$. For example, a uniform weighting may be taken, in other words such that p(t)=1 for all values of t.

The procedure according to the invention applying VITERBI's algorithm may be resumed as follows:

The following information is available at each time step k:

states $x(1), x(2) \ldots x(N)$;

each has one metric $m_k(1), m_k(2) \ldots m_k(N)$;

and one phase $t_k(1), t_k(2) \ldots t_k(N)$; and and a corresponding subscript of y $n_k(1), n_k(2) \ldots n_k(N)$.

Figure 2:
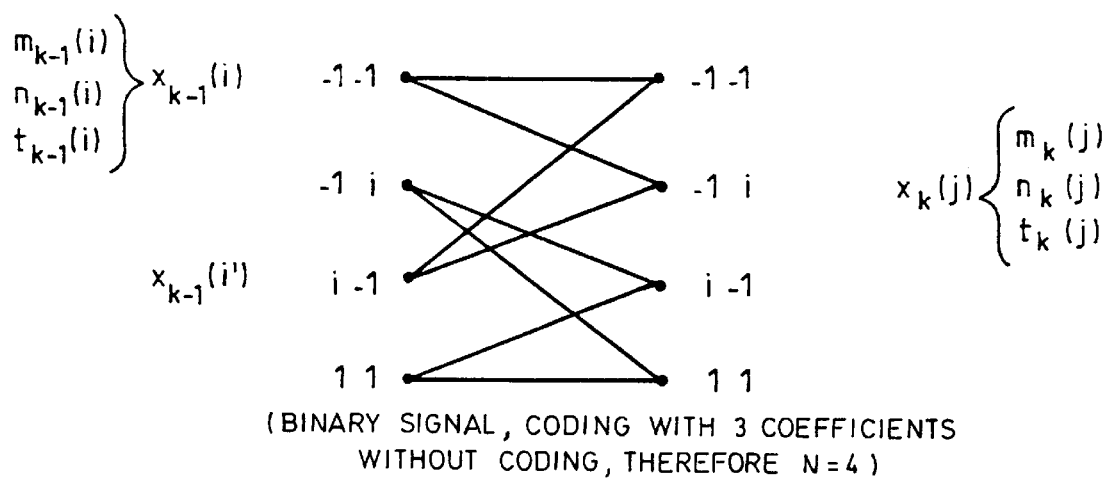
FIG. 2 shows an example of a decoding lattice.

This information remains after choosing the survivor (see FIG. 2).

All complete surviving paths are stored, as in the classical VITERBI algorithm, until a given rank k-P where P is called the depth. On initialization, for k<P, new samples of y are integrated in the decoder without supplying any more decoded states $Z_k$.

Figure 4:
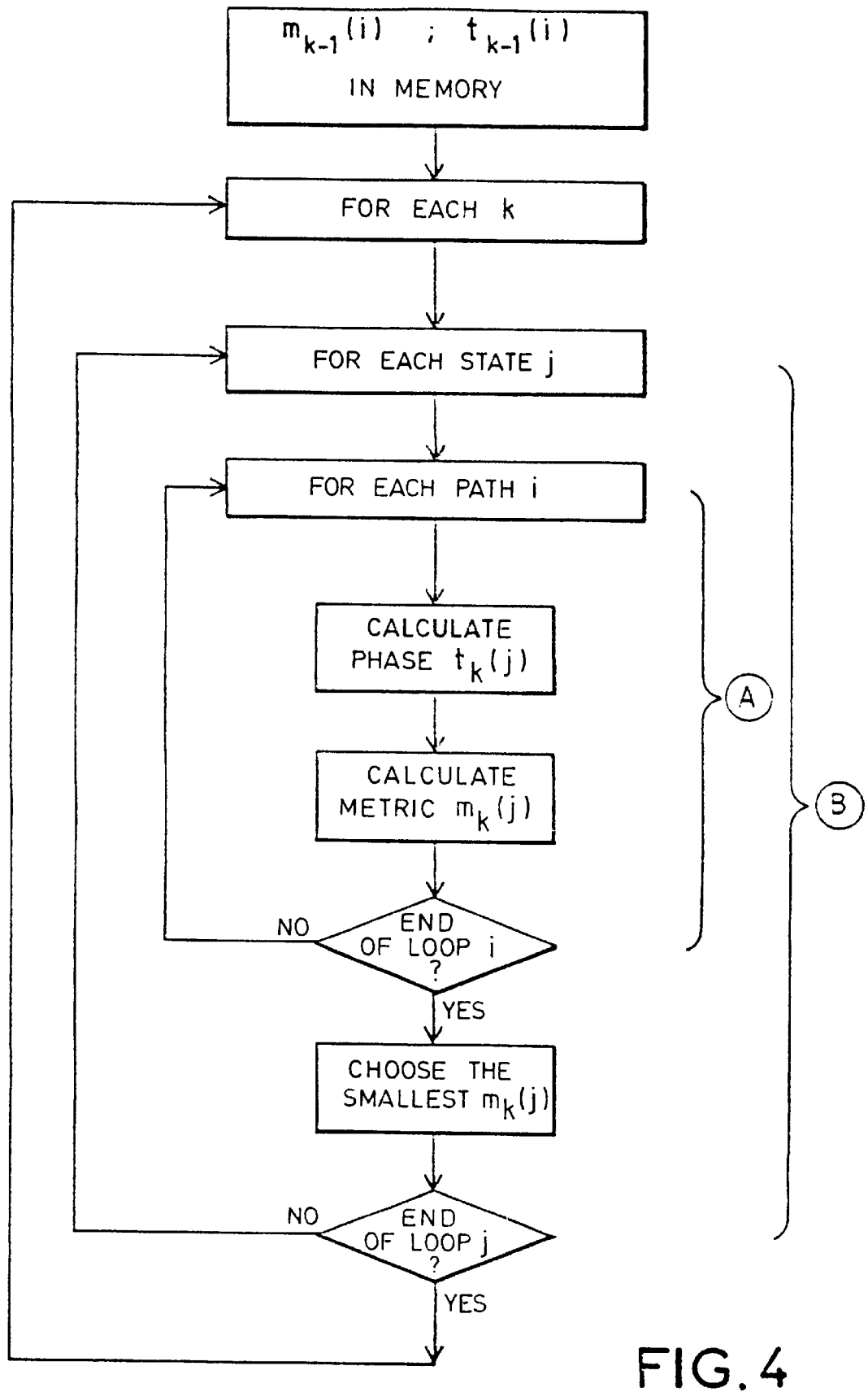
FIG. 4 is a simplified decoding flow chart applying the MLSE algorithm according to the invention.

FIG. 4 shows a simplified decoding flow chart according to the present invention in which it is assumed that the sampling frequency is equal to the frequency of the signal to be decoded. It is assumed that the following are in memory for a given sample k to be processed:

metrics $m_{k-1}(i)$ and phases $t_{k-1}(i)$ for all states i at the previous step (sample) k-1.

For this sample $x_k$, for a first state j and for a first path i leading to this first state j, a phase calculation and a metric calculation are made applying the following formulas (in vector notation):

$$e_k = X^T(i,j) \cdot k(t_{k-1}(i)) - Y_n$$

$$e'_k = X^T(i,j) \cdot k'(t_{k-1}(i))$$

phase: $t'(i) = t_{k-1}(i) + 1 - \alpha e_k e'_k$ metric: $m'(i) = e_k^2$

The vector denoted x(i,j) is the concatenation of states of x(i) and xj) (and therefore in principle corresponds to x(j) preceded by a symbol); the dimension of x(i,j) is equal to the number of significant samples in the sampled response h(t).

This operation is looped for each path i. When all paths i leading to a state j have been calculated, the phase and the metric for the path with the lowest metric are kept in memory. This operation is then looped through for each state j. When all states j and the various paths i have been calculated, a metric and a phase in exists in memory for each state. The system is then ready to process the next sample.

Figure 5:
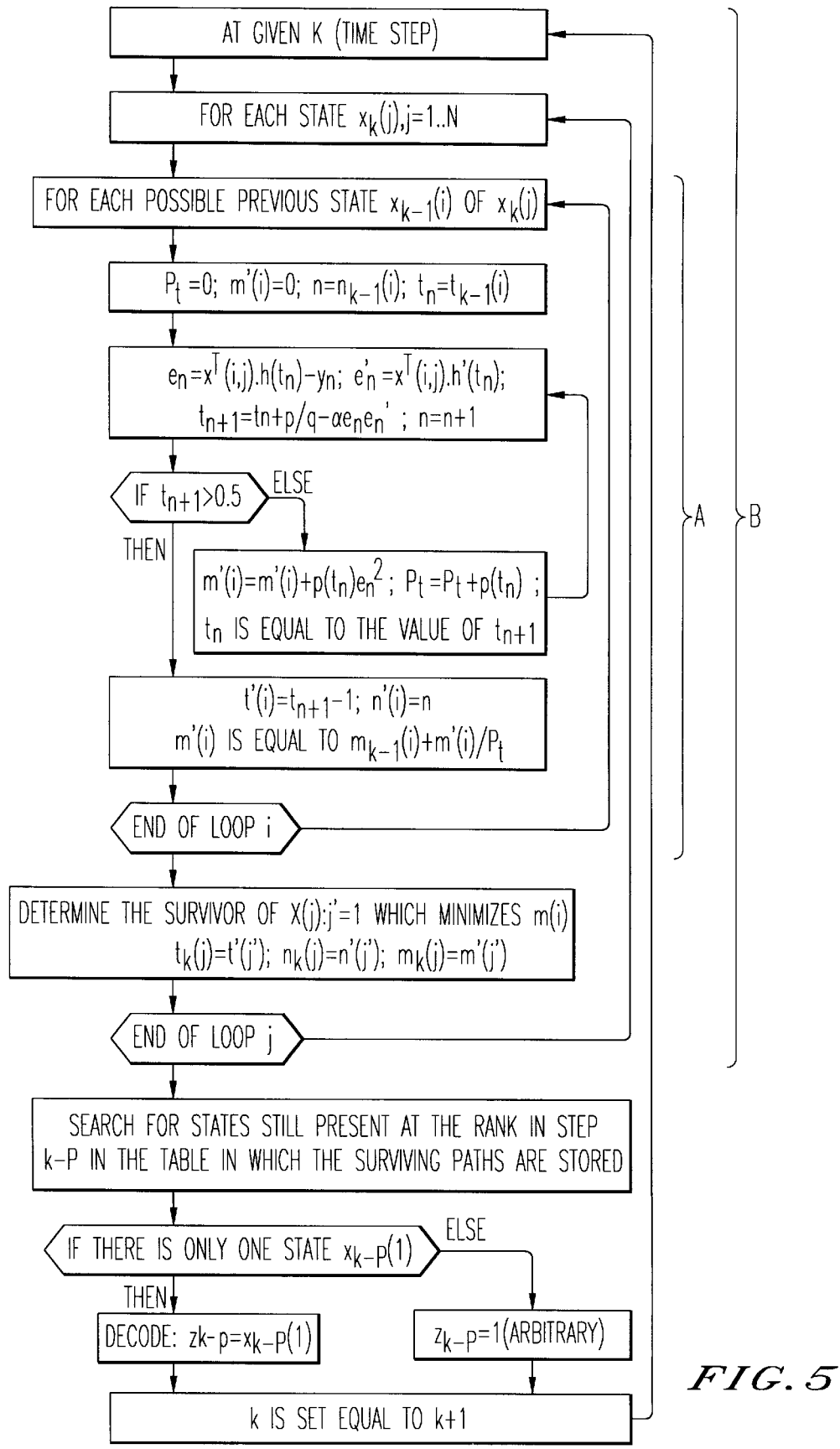
FIG. 5 shows a more detailed decoding flow chart applying the MLSE algorithm according to the invention.

FIG. 5 shows a flow chart of an example of the detailed procedure according to the present invention. This flow chart includes loop (A) shown on the flow chart in FIG. 4, and loop (B). It can be seen that loop (A) contains several additional phases corresponding to the case in which the sampling frequency exceeds the signal frequency. On the flow chart in FIG. 5, note the vector notation used to express filtering by h(t) and h'(t). $P_t$ represents the denominator in expression (3).

According to this flow chart:

for each channel input configuration, $X_k$, that is to be found, there are N possibilities x(j) which will be called states, each being connected by paths to (at most) N states x(i) corresponding to the previous input $x_{k-1}$;

for each existing state x(j), for each previous state x(i), for each sample $y_n$ at the channel output, if the time subscript n corresponds to the path connecting $X_{k-1}$ to $x_k$ for the states considered x(i) and x(j), the phase $t_n$ and a metric term characterizing the path length, are calculated.

When all previous states x(i) and all samples $y_n$ to be taken into account have been processed in this way, only one previous state x(i) is kept in memory and is called the survivor, and is chosen so that it minimizes the sum of its previous metric and the metric terms that have just been calculated. This sum forms the new metric for the current state x(j), and will also be memorized together with the corresponding phase and the last value of the subscript n; and choosing survivors makes it possible to select probable paths during the procedure, and to eliminate others such that there is only one left which will provide the decoded input. The previous operations are restarted for input k+1 and the corresponding new samples $y_n$ (n depending on the envisaged state x(j)). Therefore, this choice of survivors can mean that previously memorized paths will be abandoned. It can be seen that by working backwards, the number of possible paths decreases and that there will soon be only one path. This single path is the sequence decoded using the maximum likelihood principle.

Therefore, the present invention proposes first a method of determining the phase of transmitted data with respect to the sampling clock, and second it forms an extension of the VITERBI algorithm.

For each branch in the decoding lattice which is built in the same way as for the VITERBI algorithm, the phase is determined recursively using a gradient method using the derivative of the channel pulse response. This information is then integrated in the model of the channel which is used to calculate the metrics. When metrics have been calculated, the procedure is the same as for the classical VITERBI algorithm.

Note that the phase information calculated by the procedure according to the present invention may be kept for every state of the lattice, in the same way as for the metric obtained using the VITERBI algorithm. Unlike the phase, it is assumed that the pulse response of the channel is known in advance.

The present invention has the following advantages:

being able to work on a signal sampled at a very low frequency despite withdrawal, or at the symbol frequency itself, and using a channel without giving it a particular partial response, unlike what is usually proposed when the VITERBI decoding is used in magnetic recording, which saves equalization. In particular, a Nyquist channel can be used (unlike the simple VITERBI decoder which will not work in this case).

What is claimed as new and desired to be secured by Letters Patent of the United States is:

1. A procedure for information transmission utilizing a system for reception of data signals by sampling using clock signals, comprising:

calculating a phase shift between said clock signals and said data signals using a formulation of the gradient:

$$t_{n+1} = t_n + p/q - \alpha e_n(t_n) e'_n(t_n),$$

wherein:

$t_{n+1}$: a phase shift signal to be calculated for a rank n+1 data signal;

$t_n$: a phase shift signal calculated previously for a rank n data signal;

p/q: a ratio of a clock period to a data period;

$\alpha$: a matching coefficient;

$e_n(t_n)$: an error between a real sample and an assumed theoretical value; and $e'_n(t_n)$: a derivative of the value of $e_n(t_n)$ with respect to $t_n$, the value $e_n(t_n)$ being given by:

$$e_n(t) = \sum_k z_k h(nT_e - kT_s + t) - y_n$$

wherein:
- $z_k$: a theoretical value of the data signal;
- h: the pulse response from a channel and the value $e'_n(t_n)$ being given by:

$$e'_n(t) = \sum_k z_k h'(nT_e - kT_s + t)$$

where h' is a derivative of the channel pulse response with respect to time;
- Te: the period $(1/f_e)$;
- Ts: the symbol period $(1/f_s)$; and
- Yn: the sampled signal.

2. The procedure according to claim 1, wherein:
N possible states exist for each channel input configuration, $x_k$, each being connected by a number of paths equal to not more than N states x(i) corresponding to a previous input $x_{k-1}$;

calculating the phase $t_n$ and a metric term characterizing the path length for each existing state x(j), for each previous state x(i), for each sample $y_n$ at the channel output, if the time subscript n corresponds to the path connecting $x_{k-1}$ to $x_k$ for the states considered x(i) and x(j);

processing all previous states x(i) and all samples $y_n$ to find only one survivor previous state x(i) and storing said survivor in memory, said survivor is chosen to minimize a sum of its previous metric and the metric terms that have just been calculated, the sum forming a new metric for an existing state xj), and also being memorized together with a corresponding phase and a last value of the subscript n; and choosing survivors to select probable paths during the procedure and to eliminate others such that there is only one survivor left providing the decoded data.

3. The procedure according to claim 2, wherein the metric of the path connecting one state to a previous state is found by performing the following operation:

$$m(i) = \frac{\sum_n p(t_n) e_n^2(t_n)}{\sum_n p(t_n)}$$

where $p(t_n)$ values correspond to weights assigned to phases $t_n$; and storing in memory each estimated phase and each metric for each state, said procedure being performed for each data sample.

4. The procedure according to claim 3, wherein the calculation procedure is performed for several samples of a variable until the phase $t_{n+1}$ exceeds a threshold value.

5. The procedure according to claim 4, wherein the value of the threshold is 0.5.

6. The procedure according to claim 1, further comprising:

applying a maximum likelihood sequence estimation (MLSE) algorithm to a decoding procedure; and performing a phase shift calculation at a same time as a metric calculation in said maximum likelihood sequence estimation (MLSE).

* * * * *